AUDIBLE MULTISWITCH TRANSITION DETECTOR

Filed Nov. 13, 1967

INVENTORS.
EDGAR O. MORGENSON
WILLIAM A. LACHER
BY Edward J. Feeney Jr.
ATTORNEY

3,524,179
AUDIBLE MULTISWITCH TRANSITION DETECTOR

Edgar O. Morgenson, Norristown, and William A. Lacher, North Wales, Pa., assignors to Burroughs Corporation, Detroit, Mich., a corporation of Michigan Filed Nov. 13, 1967, Ser. No. 682,444
Int. Cl. G08b *19/00*
U.S. Cl. 340—253 7 Claims

ABSTRACT OF THE DISCLOSURE

The present disclosure relates to a multiswitch transition detector which provides an output signal when any one of a plurality of switches is either opened or closed. In the present embodiment the output is of one audio frequency if the switch transition is from opened to closed condition and of a second audio frequency if the transition is reversed. A timing apparatus is included with each output signal oscillator to provide the audio signal for a predetermined duration.

BACKGROUND OF THE INVENTION

Field of the invention

The present invention may find general use in the field of communication systems. For example, in a message switching center, it is important for the operator to know about a change in status of a plurality of line switches which determine whether a sending or receiving operation is being performed. The present invention would not only indicate that one of a plurality of switches had been switchably activated, but would also inform the operator as to the direction of the activation, i.e. opened or closed.

Description of the prior art

In the past, status systems to determine the switchable condition of a plurality of communicable transmission lines included extensive and complicated mechanisms to provide the operator with the necessary information. It should be noted that this disclosure only discusses the signals necessary to make an operator aware of a change in status of one or more of $x$ number of lines. It does not indicate which lines have changed. In practice, another set of contacts would probably be required on switches to drive an indicator system where this system makes the operator look at the indicator. For example, one known system used multiple sets of additional contacts on each of the line switching relays. In addition a substantial amount of circuitry was used in conjunction with each set of contacts. When this circuitry is multipled by the numerous line switches used in present day systems, it is readily realized that the complexity of the necessary circuitry approaches the intolerable. For example, the present system envisions the use of 512 switchable lines. However, from the following description, it will be seen that the present flexible arrangement may be easily adapted to be used with more or less lines depending upon system requirements.

BRIEF SUMMARY OF THE INVENTION

The present invention provides a system which detects the directional transition of any one of a plurality of switches by basically using a magnetic switching core with a primary winding, a resistor and a capacitor in conjunction with each of the plurality of switches.

Each primary winding is switched between oppositely polarized power sources by the opening and closing action of one of the switches and two single turn sense windings threaded through all of the cores.

Each of the two sense windings are connected to an amplifier, a timing apparatus and an audio signalling means. The output signal frequency is different for each of the two audio signalling means.

BRIEF DESCRIPTION OF THE DRAWINGS

The invention may be better understood from the following detailed description taken together with the drawings, in which like elements have like designations and similar components in both figures have correspondingly suffixed reference characters. In the drawings.

DETAILED DESCRIPTION

Figure 1:
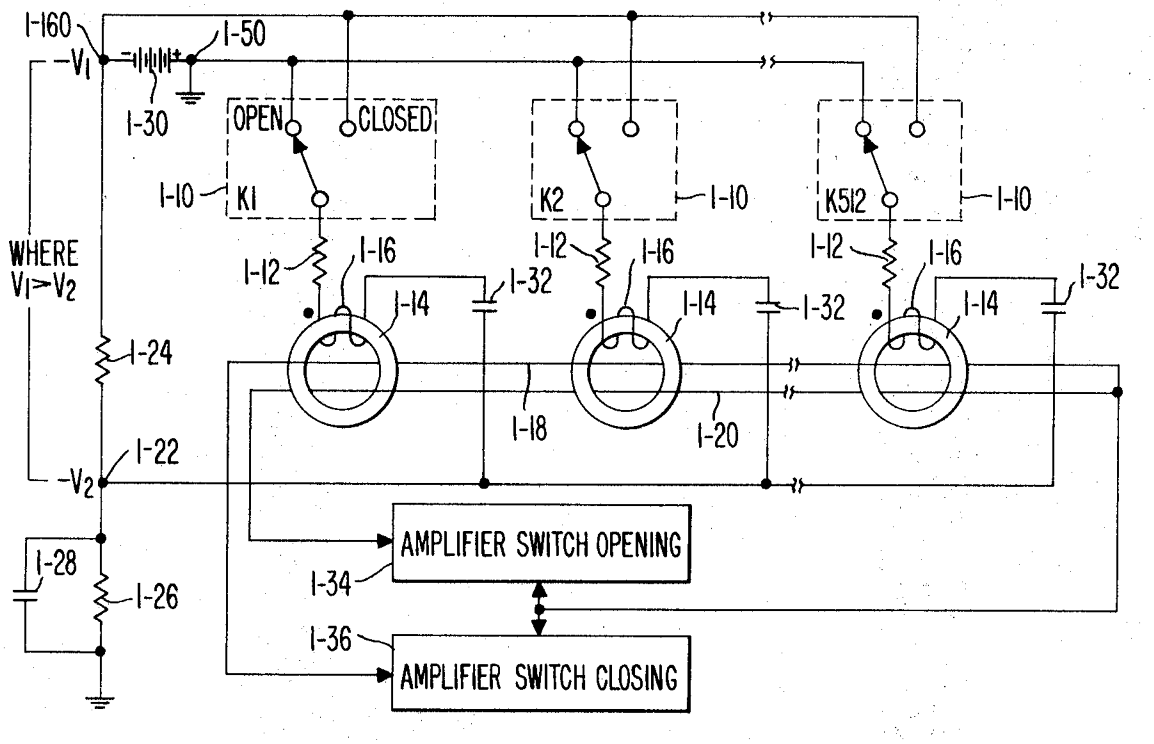
FIG. 1 is a partial-block, partial-schematic diagram of a multiswitching transition detector with a full complement of cores in a typical system.

Referring to FIG. 1, there is shown a typical system with the capability of sensing any one of 512, as an example, relay contacts opening and closing. One core 1–14, one resistor 1–12 and a capacitor 1–32 per line are referenced, it being understood that the remaining core/line segments of the system have corresponding components with corresponding functions.

A multiturn primary winding 1–16 is wound on each of the magnetic switching cores 1–14. A first sense winding 1–18 passes through each of the cores 1–14 in a first direction and a second sense winding 1–20 passes through each of the cores in a second direction. By having these sense windings 1–18, 1–20 coupled to the cores in opposed directions, the switching of the core 1–14 in a first direction, i.e. by passage of current through the primary winding 1–16 in a first direction, causes a current to flow in the sense windings 1–18, 1–20 in opposite directions. Thus, if sense line 1–20 applies a negative signal to the amplifier 1–34, denoting a switch opening, the sense line 1–18 applies a positive signal to amplifier 1–36. Conversely, if the core 1–14 is switched in the reverse direction by the passage of current through the primary 1–16 in the opposite direction, then a negative signal is sensed by winding 1–18 and applied to amplifier 1–36 to denote a switch opening.

The reversal of current in the primary winding 1–16 is accomplished by having a resistor and a capacitor serially coupled to the primary winding and the combination connected at one end to an intermediate voltage source 1–22. The other end of the resistor 1–12 is alternately connected, by switch 1–10 to a ground reference level 1–50 and a voltage source $-V_1$. The voltage source $-V_1$ 1–60 has a magnitude much greater than the intermediate voltage source $-V_2$, 1–22. Thus in the suggested embodiment, the voltages used were $-V_2=-24$ volts and $-V_1=-48$ volts. However, as will be apparent from a consideration of the entire specification, it is obvious that these values are arbitrary and any combination of voltage may be utilized, either positive or negative, so long as a similar relationship between the voltages is observed.

By denoting the left hand side of the switch, 1–10, OPEN, and the right hand side CLOSED, the current flow, of specified plus to minus in the position illustrated is from the ground side 1–50 of the source 1–30 through the terminal indicated OPEN of the switch 1–10 down through the resistor 1–12, the primary coil 1–16 to charge the capacitor 1–32 in a first direction with respect to its opposite terminal connected to terminal 1–22 denoted as voltage source $-V_2$.

This passage of current through the primary coil 1–16 switches the magnetic core 1–14 in a first magnetic direction and a current is initiated in sense lines 1–18 and 1–20. Since the sense lines are passed through the core 1–14 in oppositely wound coupling configurations, the currents are set up in oppositely traveling directions. Thus this provides a negative going current in one of the sense windings and a positive going current in the other. If both of the amplifiers 1–34 and 1–36 are designed such as to be responsive only to negative going signals then only the amplifier receiving the negative going sense current would be activated. In this instance, the circuit connected to the negative going signal would be the amplifier 1–34 since the switch 1–19 has just been switched to its OPEN position.

The activation of switch 1–10 to its opposite or CLOSED position places a more negative voltage $-V_1$, 1–60 on the top terminal of the capacitor 1–32 than the voltage $-V_2$ on its bottom terminal at 1–22. This voltage reversal causes current to flow from the capacitor 1–32 through the primary winding 1–14, the resistor 1–12 and the switch 1–10 to the voltage terminal 1–60 of the voltage source 1–30. This current reversal through the primary winding also reverses the direction of currents flowing in sense windings 1–18 and 1–20. Thus the amplifier 1–36 receives the negative going signal, in this instance, to provide an output signal indicating a switch closing condition.

Figure 2:
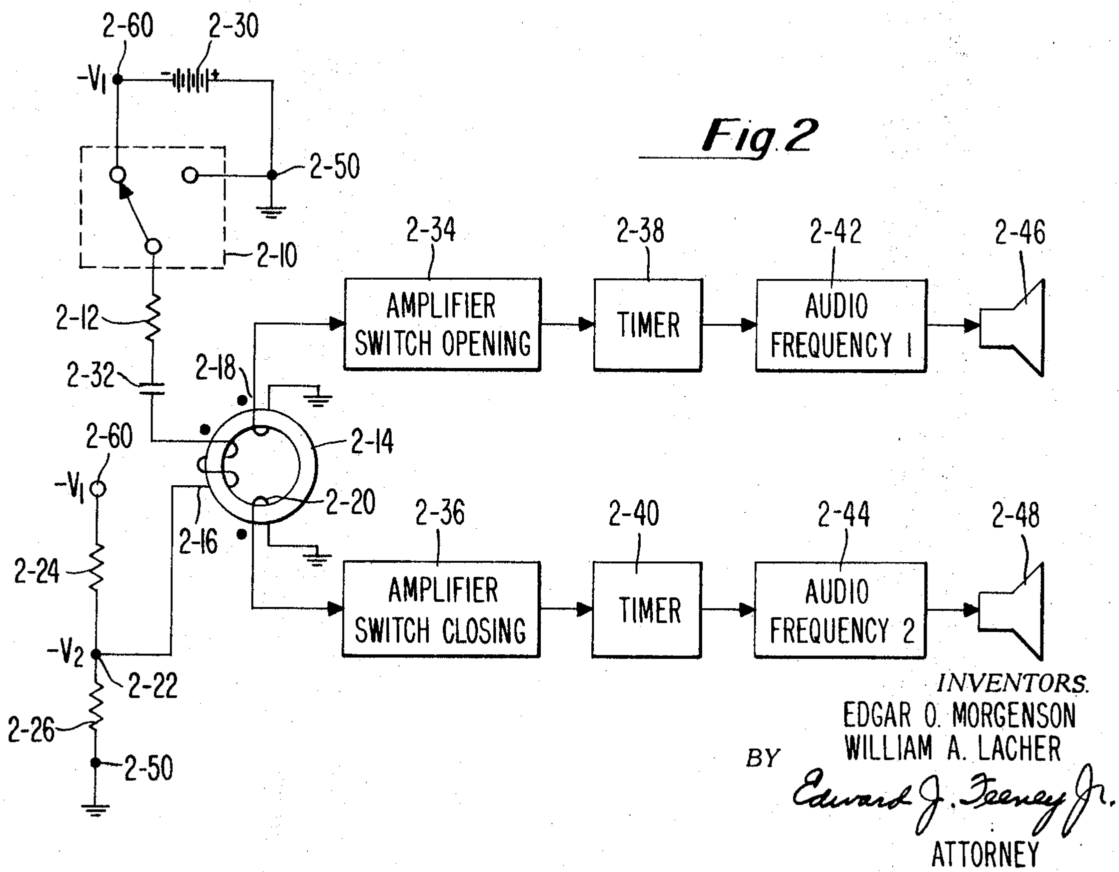
FIG. 2 illustrates a single magnetic core of the system with a timing mechanism and audio output signalling means shown in block form and connected to each of the sense lines.

FIG. 2 illustrates a slightly different capacitor configuration whose operation is nevertheless the same. In this illustration, the capacitor 2–32 is serially connected between the resistor 2–12 and the primary winding 2–16.

Further, in FIG. 2, there is shown a more complete system to provide a timed audible output from the detecting circuit. The audio oscillators 2–42, 2–44 are fixed frequency oscillators, each having a different audio output frequency. Thus, when one output signal is heard a switch opening is indicated while the other audio output signal denotes a switch closing.

Also included in each of the channels is a timer 2–38, 2–40. Each of these circuits are identical and may be of any conventional design capable of enabling the audio oscillator for a predetermined period. For example, a monostable multivibrator may be suitable.

What is claimed is:

1. A multiswitch transition detector capable of indicating the opening or closing condition of any one of a plurality of switching means, comprising a plurality of switches, a corresponding plurality of magnetic cores, each core having a primary winding and a first and an oppositely phased second sense winding wound thereon, a first, a second and a third voltage source, said second source having a voltage magnitude intermediate said first and said third source, each of said primary windings capacitively coupled between each one of said plurality of switches and said second voltage source, each of said single pole switches also switchably connected to said first and said third voltage source to alternately connect a primary winding to said first and to said third voltage sources, a first and a second channel to correspondingly provide a first and a second output signal for a predetermined time duration, said first sense winding on each of said plurality of cores serially connected together and connected to said first channel, and said oppositely phased second winding on each of said plurality of cores also serially connected together and connected to said second channel.

2. The multiswitch detector as set forth in claim 1 wherein said third voltage source is a reference ground level, said first voltage source is a fixed voltage level, and said second intermediate voltage source is a terminal of a resistive voltage divider connected between said first and said third voltage sources.

3. The multiswitch detector as set forth in claim 1 wherein said first and said second channel, each include an amplifier means, said amplifier means included in said first channel to provide an output signal upon the opening of any one said plurality of switches, and said amplifier included in said channel to provide an output signal upon the closing of any one of said plurality of switches.

4. The multiswitch transition detector as set forth in claim 1 wherein each of said plurality of switches is a set of electrical contacts physically positioned in a single pole, double throw switching configuration.

5. The multiswitch transition detector as set forth in claim 1 wherein said first channel includes a first fixed audio oscillator to provide a first frequency audio signal, and said second channel includes a second fixed audio oscillator to provide a second frequency audio signal, each of said channels having individual audible indicating means connected to said audio oscillator, and each of said channels further having a timing means coupled to respective audio oscillators to provide said audio signals for predetermined time durations.

6. An audible multiswitch transition detector capable of audibly indicating the opening or closing condition of any one of a plurality of switches, comprising a plurality of single pole, double throw switches, a corresponding plurality of magnetic cores, each core having a primary winding and a first and an oppositely phased second winding wound thereon, a first, a second and a third voltage source, said second source having a voltage magnitude intermediate said first and said third source, each of said primary windings resistively coupled to one of said plurality of single pole switches and capacitively coupled to said second voltage source, each of said single pole switches also switchably connected to said first and said third voltage source to alternately connect a primary winding to said first and to said third voltage sources, a first and a second audio output signal for a predetermined time duration, said first sense winding on each of said plurality of cores serially connected together and connected to said first audio oscillating channel, and said oppositely phased second sense winding on each of said plurality of cores also serially connected together and connected to said second audio oscillating channel to provide a first audio output signal from said first channel when said switch is thrown in one direction and a second audio output signal from said second channel when said switch is thrown in its opposite direction.

7. A switch transition detector capable of indicating the opening or closing condition of a switch, comprising a single pole, double throw switch, a magnetic switching core, said core having a primary winding and a first and an oppositely phased second sense winding wound thereon, a first and a second voltage source having a common reference level terminal, said second source having a voltage magnitude less than said first source, said primary windings resistively coupled to the switchable arm of said single pole switch and capacitively coupled to said second voltage source, said single pole switch also connected to said first voltage source and said common reference level terminal to alternately connect a primary winding to said first voltage source and said reference level terminal, a first and a second channel to correspondingly provide a first and a second output signal for a predetermined time duration, said first sense winding on each of said plurality of cores serially connected together and connected to said first channel, and said oppositely phased second sense winding on each of said plurality of cores also serially connected together and connected to said second channel to provide a first output signal from said first channel when said switch is thrown in one direction and a second output signal from said second channel when said switch is thrown in its opposite direction.

References Cited

UNITED STATES PATENTS

| | | | |
|---|---|---|---|
| 3,146,431 | 8/1964 | Betts | 340—259 |
| 3,346,855 | 10/1967 | Bishop | 340—248 |

THOMAS B. HABECKER, Primary Examiner

D. MYER, Assistant Examiner

U.S. Cl. X.R.

307—127